United States Patent
Kravetz et al.

(12) 
(10) Patent No.: US 6,397,196 B1
(45) Date of Patent: May 28, 2002

(54) HYBRID INSTALLMENT LOAN/SAVINGS ACCOUNT

(76) Inventors: Steven Kravetz, 5911 W. Fitch Ave., Chicago, IL (US) 60646; Michael Kravetz, 14541 S. Maycliff Dr., Orland Park, IL (US) 60462

(*) Notice: Subject to any disclaimer, the term of this patent is extended or adjusted under 35 U.S.C. 154(b) by 0 days.

(21) Appl. No.: 09/414,548

(22) Filed: Oct. 8, 1999

Related U.S. Application Data

(60) Provisional application No. 60/151,362, filed on Aug. 30, 1999.

(51) Int. Cl.⁷ .............................................. G06F 17/60
(52) U.S. Cl. .............................. 705/35; 705/30; 705/39
(58) Field of Search .............................. 705/30, 35, 38, 705/39, 40

(56) References Cited

U.S. PATENT DOCUMENTS

| | | | | |
|---|---|---|---|---|
| 4,774,663 A | * | 9/1988 | Masmanno et al. | 705/35 |
| 5,206,803 A | * | 4/1993 | Vitagliano et al. | 705/35 |
| 5,866,889 A | * | 2/1999 | Weiss et al. | 235/381 |
| 5,911,136 A | * | 6/1999 | Atkins | 705/35 |

FOREIGN PATENT DOCUMENTS

| | | | | |
|---|---|---|---|---|
| DE | 1140381 | * | 11/1962 | 705/35 |

OTHER PUBLICATIONS

Dallas Fort Worth Business article "Texas Commerce Offers one-stop Shopping for Consumers" (Issn: 8750–6084), date May 8, 1988.*

* cited by examiner

*Primary Examiner*—Dean J. Kramer
(74) *Attorney, Agent, or Firm*—Staas & Halsey LLP

(57) ABSTRACT

A hybrid installment loan/savings account. A financial account is created for an account holder. An amount of money is payed to the account holder, and the amount is charged to the account so that the account has an initial negative balance. Automatic payroll deduction is performed to automatically deduct pay over time from the account holder and apply the deducted pay to the account to pay off the negative balance over time. The automatic payroll deduction continues as the balance turns positive to continue accruing a positive balance in the account via the automatic payroll deduction. Interest is charged on the balance to the account when the balance is negative, and interest is payed on the balance to the account when the balance is positive.

23 Claims, 2 Drawing Sheets

HYBRID INSTALLMENT LOAN/SAVINGS ACCOUNT

CROSS-REFERENCE TO RELATED APPLICATIONS

The present application claims priority to provision application titled "COMBINED SAVINGS ACCOUNT/INSTALLMENT LOAN ACCOUNT", Ser. No. 60/151,362, filed Aug. 30, 1999, and which is incorporated herein by reference.

BACKGROUND OF THE INVENTION

1. Field of the Invention

The present invention relates to installment loans and savings accounts. More particularly, the present invention relates to a hybrid installment loan/savings account.

2. Description of the Related Art

Many banks, savings & loans, loan companies and other types of financial institutions offer installment loans to customers. With a typical installment loan, the customer is loaned an amount of money, and must make periodic payments, typically monthly, until the balance (i.e., the loan amount plus interest) is paid in full. Often, if the customer is employed, automatic payroll deduction is used to deduct pay from the customer's paycheck and apply the deducted pay into the loan account to pay off the balance. Once the balance is paid in full, any excess payment is returned to the customer, any automatic payroll deduction is stopped, the loan account is typically closed, and the relationship between the financial institution and the customer typically ends unless the loan is refinanced.

Moreover, many banks and savings & loans offer savings accounts where customers accrue a positive balance through deposits. Interest is payed on the positive balance. Typically, withdraws are allowed from a savings account, but withdraws in access of the balance are not allowed.

Further, some banks and savings & loans provide checking accounts which pay interest on positive balances. However, negative balances are strongly discouraged, and fixed penalty amounts are accessed for withdraws or checks that cause a negative balance to be incurred.

Therefore, installment loans, savings accounts and checking accounts each provide advantages and disadvantages. However, there is a need for a single type of account which provides various advantages of installment loans, savings accounts and checking accounts.

SUMMARY OF THE INVENTION

Accordingly, it is an object of the present to combine advantages of installment loans, savings accounts and checking accounts into a single type of account.

More specifically, it is an object of the present invention to provide a hybrid installment loan/savings account in which an amount of money is loaned to a customer, automatic payroll deduction is applied to pay off the loan but continues even after the loan is paid in full, interest is charged when the balance is negative, and interest is paid when the balance is positive. In this manner, a customer can use automatic payroll deduction to pay off the loan amount, and then continue the automatic payroll deduction to accrue savings while earning interest. This type of account is desirable for financial institutions as a way to maintain an ongoing, positive relationship with a customer even after an installment loan has been paid in full.

Additional objects and advantages of the invention will be set forth in part in the description which follows, and, in part, will be obvious from the description, or may be learned by practice of the invention.

Objects of the present invention are achieved by providing a method which includes (a) creating an account for an account holder, the account having a balance which can be positive or negative; (b) performing automatic payroll deduction to automatically deduct pay over time from the account holder and apply the deducted pay to the balance of the account, the automatic payroll deduction continuing irrespective of whether the balance is negative or positive; (c) when the balance is negative, charging interest on the balance to the account; and (d) when the balance is positive, paying interest on the balance to the account.

Objects of the present invention are further achieved by providing an apparatus which includes a financial account of an account holder, and a payroll deduction system. The financial account has a balance which can be positive or negative, interest being charged on the balance to the account when the balance is negative, and interest being paid on the balance to the account when the balance is positive. The payroll deduction system performs automatic payroll deduction to deduct pay over time from the account holder and apply the deducted pay to the balance of the account. The automatic payroll deduction continues irrespective of whether the balance is negative or positive.

Moreover, objects of the present invention are achieved by providing a method which includes (a) creating an account for an account holder; (b) paying an amount of money to the account holder, and charging the amount to the account so that the account has an initial negative balance; (c) performing automatic payroll deduction to automatically deduct pay over time from the account holder and apply the deducted pay to the account to pay off the negative balance over time, the automatic payroll deduction continuing as the balance turns positive to continue accruing a positive balance in the account via the automatic payroll deduction; (d) charging interest on the balance to the account when the balance is negative; and (e) paying interest on the balance to the account when the balance is positive.

Objects of the present invention are also achieved by providing an apparatus which includes a financial account of an account holder, and a payroll deduction system. An amount of money is paid to the account holder and charged to the account so that the account has an initial negative balance. The payroll deduction system performs automatic payroll deduction to automatically deduct pay over time from the account holder and apply the deducted pay to the account to pay off the negative balance over time. The automatic payroll deduction continues as the balance turns positive to continue accruing a positive balance in the account via the automatic payroll deduction. Interest is charged on the balance to the account when the balance is negative, and interest is payed on the balance to the account when the balance is positive.

BRIEF DESCRIPTION OF THE DRAWING

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
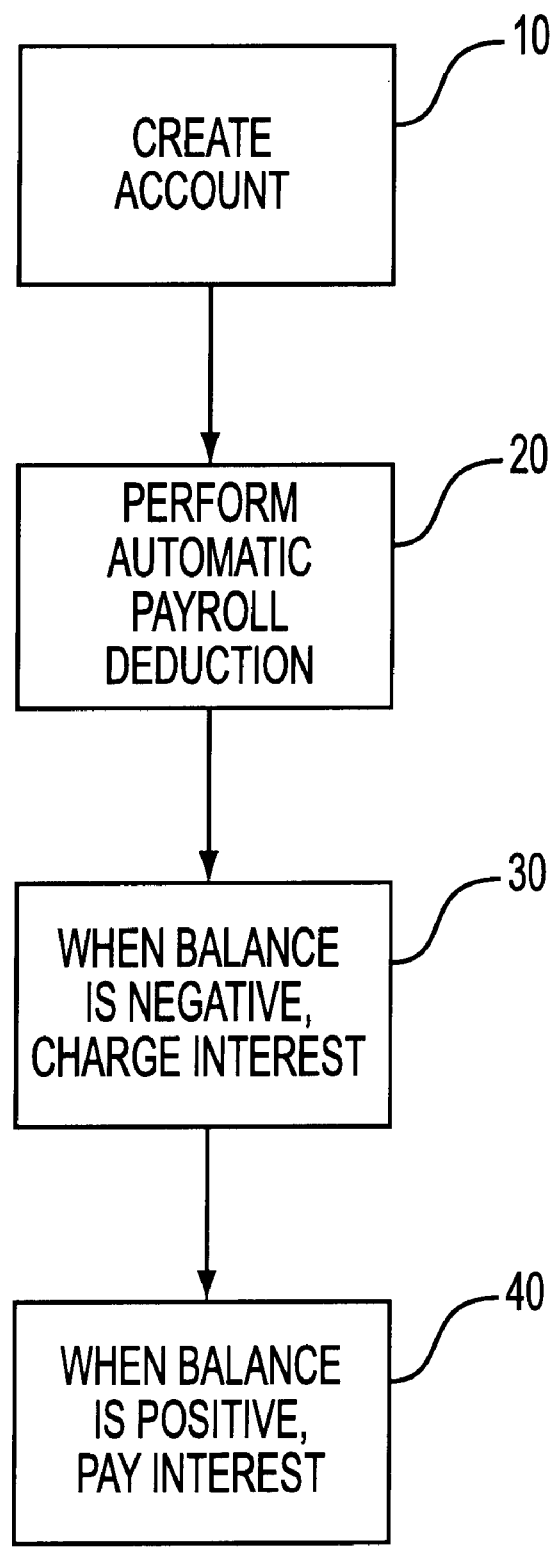
FIG. 1 is a flow chart illustrating the operation of a hybrid installment loan/savings account, according to an embodiment of the present invention.

Reference will now be made in detail to the present preferred embodiments of the present invention, examples of which are illustrated in the accompanying drawings, wherein like reference numerals refer to like elements throughout.

FIG. 1 is a flow chart illustrating the operation of a hybrid installment loan/savings account, according to an embodiment of the present invention. Referring now to FIG. 1, in step 10, an account is created for an account holder (i.e., a customer of the a financial institution, such as, for example, a bank). The account can have a balance which is positive or negative. Typically, when the account is initially created, an amount of money is loaned to the account holder by the financial institution, and this amount is charged to the account so that the account has an initial, negative balance.

From step 10, the process moves to step 20, where automatic payroll deduction is performed to automatically deduct pay over time from the account holder and apply the deducted pay to the balance of the account. Preferably, with the automatic payroll deduction, pay is deducted and applied to the account at specific time intervals, such as once a month, or once every paycheck. Therefore, activities must be coordinated between an employer of the account holder and the financial institution to set up, initiate and maintain automatic payroll deduction. Automatic payroll deduction is well-known in the loan industry, and there are many available systems for setting up and initiating automatic payroll deduction. Preferably, the automatic payroll deduction is electronically performed on a scheduled basis, with deducted pay being electronically transferred to the account. However, the present invention is not limited to electronic payroll deduction, and it is possible for payroll deduction to be performed manually, with the employer manually sending payments to the financial institution on a regularly scheduled basis. Moreover, in some embodiments of the present invention, payments could be made to the financial institution directly by the account holder.

From step 20, the process moves to step 30, where, if the balance on the account is negative, interest is charged on the balance to the account. Here, the interest can be charged at specific time intervals, such as monthly or at the time that a payroll deduction is applied to the account. There are many time intervals at which interest can be charged, and the present invention is not limited to any specific time interval. Moreover, there are many different manners to compute interest to be charged, and the present invention is not limited to any specific manner. The present invention is not limited to any specific interest rate. Further, it is not necessary to charge interest in all embodiments of the present invention. For example, no interest might be charged when the balance is negative, or if the balance is negative up to a specific maximum amount after which interest might then be charged.

From step 30, the process moves to step 40, where, if the balance on the account is positive, interest is payed on the balance to the account. The interest can be paid at specific time intervals, such as monthly or at the time that a payroll deduction is applied to the account. There are many time intervals at which interest can be paid, and the present invention is not limited to any specific time interval. Moreover, there are many different manners to compute interest to be paid, and the present invention is not limited to any specific manner. The present invention is not limited to any specific interest rate. Further, it is not necessary to pay interest in all embodiments of the present invention. For example, no interest might be payed when the balance is positive, or if the balance is positive up to a specific amount after which interest might then be paid.

As indicated in FIG. 1, automatic payroll deduction is initialed to pay off the loan balance. However, in the present invention, the automatic payroll deduction does not stop after the balance is paid in full. Instead, the automatic payroll deduction continues so that savings is accrued in the account. As a result, when the balance is negative, interest can be charged to the account. When the balance is positive, interest can be paid to the account.

In the present invention, the initially balance of the account would typically be negative, as the account would typically be initiated with a loan. In a typical situation, the account holder would be able to borrow more money on the account at any time, or after a certain amount of the loan is paid off.

However, it is not necessary for the account to be initiated with a loan. For example, the account could be initiated with automatic payroll deduction to accrue savings, with no loan being made. Then, as savings are accrued, money could be withdrawn from the account, or loans can be made on the account. When the balance is negative, interest is charged to the account. When the balance is positive, interest is paid on the account.

There are many different types of agreements which can be used to define the contractual obligations of the account holder and the financial institution. For example, when the account is opened, a "revolving" type of credit agreement might be signed by the account holder. With a revolving type credit agreement, no further contract documentation may be necessary for future withdrawals or deposits to the account. Moreover, an agreement might allow the account holder to repeatedly make withdraws from the account or "refinance" the loan portion without the necessity of additional contract documentation being signed. In addition, the account holder might be provided with the ability to make withdrawals and deposits through an ATM network.

This type of hybrid installment loan/savings account provides many advantages for the account holder. For example, it allows the account holder a convenient manner to obtain a loan and accrue savings after the loan is paid. Further, it provides a way for a financially troubled account holder to obtain a loan to pay off debts, learn financial discipline by saving money on a scheduled basis to pay off the loan through automatic payroll deduction, and to continue this disciplined savings approach to accrue interest bearing savings.

This type of hybrid installment loan/savings account also provides many advantages for the financial institution. For example, it allows the financial institution to obtain new account holders by issuing loans, and keep these account holders on a long-term basis after the loans are paid. Also, the financial institution can accrue a large saving account base through the automatic payroll deductions. Moreover, many people do not have bank accounts and live paycheck to paycheck. The hybrid installment account/savings account provides a mechanism for financial institutions to reach out to these people, and turn them into good, long-term customers.

Figure 2:
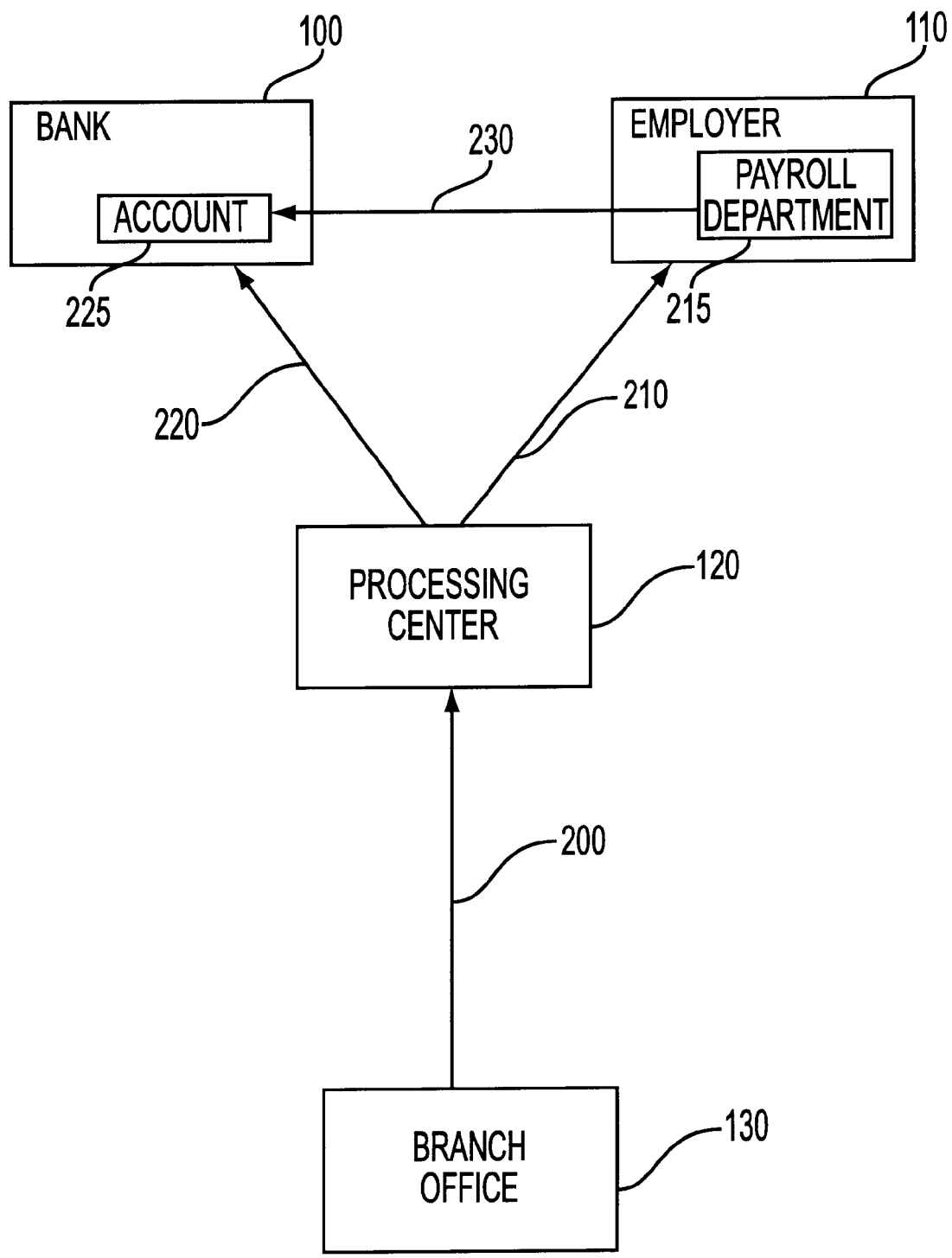
FIG. 2 is a diagram illustrating an organization structure for implementing a hybrid installment loan/savings account, according to an embodiment of the present invention.

FIG. 2 is a diagram illustrating an organizational structure for implementing a hybrid installment loan/savings account, according to an embodiment of the present invention. Referring now to FIG. 2, several parties would typically be involved in the overall transaction, including, for example, a bank 100, an employer 110, a processing center 120 and a branch office 130. A customer applies for an account at branch office 130. At this time, the customer would typically be required to complete an application form, and provide certain documentation. For example, the customer might be required to present personal identification information, employer identification information, a recent payroll stub, a utility bill or a piece of mail (as proof of residence). There are many different types of information which might be required to apply for an account, and the present invention is not limited to any specific types of information.

Then, as indicated by communication line 200, branch office 130 would typically provide the obtained information to processing center 120. Functions of processing center 120 might include, for example, verifying the customer identification, current address, employer and telephone numbers.

As indicated by communication line 210, processing center 120 would typically communicate with a payroll department 215 of employer 110 to initiate automatic payroll deduction.

As indicated by communication line 220, processing center 120 would also communicate with bank 120 to set up an account 225. As indicated by communication line 230, payroll department 215 would typically communicate with bank 100 to apply the payroll deduction to account 225.

Processing center 120 could perform many different functions. For example, processing center 120 might maintain all account balances on a computer, maintain and file all original signed account documents, answer customer calls regarding questions of refinancing, provide general product information, maintain payroll allotment forms for different payroll departments of different employers, generate and mail monthly customer balance statements, generate contracts and related documents to branch offices, and/or provide related administrative duties. By performing such functions, processing center 120 could operate as an efficient coordinator of many activities between the various parties.

The various different parties in FIG. 2 represent only one possible example of parties involved in the overall operation. For example, it may not be necessary to use processing center 120. Instead, many of the functions performed by processing center 120 could be performed by bank 100 and/or branch office 130. Or, processing center 120 and branch office 130 could be eliminated, and most activities could be performed solely by the bank. Therefore, the present invention is not limited to requiring all the parties shown in FIG. 2, or having all the specific functions described for the parties in FIG. 2. Instead, many different variations are possible.

The present invention relates to financial institutions, such as, for example, banks, savings & loans, credit unions and loan companies. However, the present invention is not limited to any specific types of financial institutions, and various different types of financial institutions might be involved in various aspects of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:

creating an account for an account holder, the account being a single account as opposed to a combination of separate accounts operating in parallel, the account having a balance which can be positive or negative;

paying an amount of money and charging the amount to the account so that the account has an initial balance which is negative;

performing automatic payroll deduction to automatically deduct pay over time from the account holder and apply the deducted pay to the balance of the account, the automatic payroll deduction being performed to pay off the initial balance and continuing thereafter to thereby accrue a positive balance in the account;

when the balance is negative, charging interest on the balance to the account; and when the balance is positive, paying interest on the balance to the account.

2. A method as in claim 1, wherein the automatic payroll deduction is electronic payroll deduction initiated in conjunction with an employer of the account holder, the pay being automatically deducted in specific amounts on a scheduled basis.

3. A method as in claim 1, wherein the automatic payroll deduction continues even when the balance is positive, until canceled by the account holder.

4. A method as in claim 1, further comprising, after the balance of the account turns positive:

allowing the account holder to withdraw money from the positive balance, the withdrawn money being charged to the account.

5. An apparatus comprising:

a financial account of an account holder, the account being a single account as opposed to a combination of separate accounts operating in parallel, the account having a balance which can be positive or negative and having an initial balance which is negative, interest being charged on the balance to the account when the balance is negative, and interest being paid on the balance to the account when the balance is positive; and a payroll deduction system performing automatic payroll deduction to deduct pay over time from the account holder and apply the deducted pay to the balance of the account, the automatic payroll deduction being performed to pay off the initial balance and continuing thereafter to thereby accrue a positive balance in the account.

6. An apparatus as in claim 5, wherein the payroll deduction system is initiated in conjunction with an employer of the account holder, to automatically and electrically deduct pay in specific amounts on a scheduled basis.

7. An apparatus as in claim 5, wherein the automatic payroll deduction continues even when the balance is positive, until canceled by the account holder.

8. A method comprising:

creating an account for an account holder, the account being a single account as opposed to a combination of separate accounts operating in parallel;

paying an amount of money and charging the amount to the account so that the account has an initial negative balance;

performing automatic payroll deduction to automatically deduct pay over time from the account holder and apply the deducted pay to the account to pay off the negative balance over time, the automatic payroll deduction continuing as the balance turns positive to continue accruing a positive balance in the account via the automatic payroll deduction;

charging interest on the balance to the account when the balance is negative; and paying interest on the balance to the account when the balance is positive.

9. A method as in claim 8, wherein the automatic payroll deduction is electronic payroll deduction initiated in conjunction with an employer of the account holder, the pay being automatically deducted in specific amounts on a scheduled basis.

10. A method as in claim 8, wherein the automatic payroll deduction continues with the account having a positive balance, until canceled by the account holder.

11. An apparatus comprising:

a financial account of an account holder, the account being a single account as opposed to a combination of separate accounts operating in parallel, an amount of money being paid to the account holder and charged to the account so that the account has an initial negative balance;

a payroll deduction system performing automatic payroll deduction to automatically deduct pay over time from the account holder and apply the deducted pay to the account to pay off the negative balance over time, the automatic payroll deduction continuing as the balance turns positive to continue accruing a positive balance in the account via the automatic payroll deduction;

wherein interest is charged on the balance to the account when the balance is negative, and interest is paid on the balance to the account when the balance is positive.

12. An apparatus as in claim 11, wherein the automatic payroll deduction is initiated by the payroll deduction system in conjunction with an employer of the account holder, the pay being automatically deducted in specific amounts on a scheduled basis.

13. An apparatus as in claim 11, wherein the payroll deduction system continues to deduct pay with the account having a positive balance, until canceled by the account holder.

14. A method comprising:

creating an account fore an account holder, the account being a single account as opposed to a combination of separate accounts operating in parallel;

paying an amount of money and charging the amount to the account so that the account has an initial negative balance;

performing automatic payroll deduction to automatically deduct pay over time from the account holder and apply the deducted pay to the account to pay off the negative balance over time, the automatic payroll deduction continuing as the balance turns positive so that a positive balance continues to accrue in the account with each subsequent deduction in pay applied to the account;

charging interest on the balance to the account when the balance is negative; and paying interest on the balance to the account when the balance is positive.

15. A method as in claim 14, wherein the automatic payroll deduction continues with the account having a positive balance, until canceled by the account holder.

16. A method as in claim 14, further comprising, after the balance of the account turns positive:

allowing the account holder to withdraw money from the positive balance, the withdrawn money being charged to the account.

17. An apparatus comprising:

means for providing a financial account of an account holder, the account being a single account as opposed to a combination of separate accounts operating in parallel, the account having a balance which can be positive or negative, an amount of money being paid and charged to the account so that the account has an initial negative balance, interest being charged on the balance to the account when the balance is negative, and interest being paid on the balance to the account when the balance is positive; and means for performing automatic payroll deduction to automatically deduct pay over time from the account holder and apply the deducted pay to the balance of the account to pay off the initial negative balance and to accrue a positive balance in the account after the initial negative balance is fully paid, the automatic payroll deduction continuing irrespective of whether the balance is negative or positive.

18. A method comprising:

creating an account by a financial institution for a person who does not have a preexisting account with the financial institution, the account being created upon completion of a contract for the account by said person and being a single account as opposed to a combination of separate accounts operating in parallel;

paying an amount of money and charging the amount to the account so that the account has an initial negative balance;

performing automatic payroll deduction to automatically deduct pay over time from said person and apply the deducted pay to the account to pay off the negative balance over time, the automatic payroll deduction continuing as the balance turns positive, without requiring an additional contract or account documentation to be completed by said person, so that a positive balance continues to accrue in the account with each subsequent deduction in pay applied to the account;

charging interest on the balance to the account when the balance is negative; and paying interest on the balance to the account when the balance is positive.

19. A method as in claim 18, wherein the automatic payroll deduction continues with the account having a positive balance until canceled by said person.

20. A method as in claim 18, further comprising, after the balance of the account turns positive:

allowing said person to withdraw money from the positive balance, the withdrawn money being charged to the account.

21. An apparatus comprising:

means for creating an account by a financial institution for a person who does not have a preexisting account with the financial institution, the account being created upon completion of a contract for the account by said person and being a single account as opposed to a combination of separate accounts operating in parallel;

means for paying an amount of money and charging the amount to the account so that the account has an initial negative balance;

means for performing automatic payroll deduction to automatically deduct pay over time from said person and apply the deducted pay to the account to pay off the negative balance over time, the automatic payroll deduction continuing as the balance turns positive, without requiring an additional contract or account documentation to be completed by said person, so that a positive balance continues to accrue in the account with each subsequent deduction in pay applied to the account;

means for charging interest on the balance to the account when the balance is negative; and means for paying interest on the balance to the account when the balance is positive.

22. An apparatus as in claim 21, wherein the automatic payroll deduction continues with the account having a positive balance until canceled by said person.

23. An apparatus as in claim 21, further comprising, after the balance of the account turns positive:

allowing said person to withdraw money from the positive balance, the withdrawn money being charged to the account.

* * * * *

UNITED STATES PATENT AND TRADEMARK OFFICE
CERTIFICATE OF CORRECTION

PATENT NO.     : 6,397,196 B1
DATED          : May 28, 2002
INVENTOR(S)    : Steven Kravetz et al.

It is certified that error appears in the above-identified patent and that said Letters Patent is hereby corrected as shown below:

<u>Title page,</u>
Item [56], U.S. PATENT DOCUMENTS, first entry, change "Masmanno" to
-- Musmanno --.

<u>Column 5,</u>
Line 4, delete "-".

<u>Column 7,</u>
Line 41, change "fore" to -- for --.

Signed and Sealed this

Ninth Day of July, 2002

*Attest:*

*Attesting Officer*

JAMES E. ROGAN
*Director of the United States Patent and Trademark Office*